US005513945A

United States Patent [19]

Hartmann et al.

[11] Patent Number: 5,513,945

[45] Date of Patent: May 7, 1996

[54] APPARATUS FOR REMOVING THE UPPER WASTE LAYER RESULTING IN CUTTING PLASTIC POROUS CONCRETE BLOCKS OR THE LIKE

[75] Inventors: Wilfried Hartmann, Emmering; Eberhard Ansorge, Eichenau, both of Germany

[73] Assignee: Hebel Aktiengesellschaft, Emmering, Germany

[21] Appl. No.: 359,577

[22] Filed: Dec. 20, 1994

[30] Foreign Application Priority Data

Dec. 31, 1993 [DE] Germany .......................... 43 45 042.3

[51] Int. Cl.$^{6}$ .................................................... B65G 59/02

[52] U.S. Cl. .......................... 414/626; 414/796.9; 294/61

[58] Field of Search ............................ 414/796.2, 796.5, 414/796.9, 609, 618, 626, 630; 294/61, 120; 271/18.3

[56] References Cited

U.S. PATENT DOCUMENTS

| | | | |
|---|---|---|---|
| 3,285,649 | 11/1966 | Harton | 294/61 |
| 3,326,592 | 6/1967 | Pelton | 294/61 |
| 3,386,763 | 6/1968 | Ottaway et al. | 294/61 |
| 3,687,306 | 8/1972 | Ransom | 414/796.9 X |
| 3,716,148 | 2/1973 | Varga | 414/796.9 |
| 3,758,934 | 9/1973 | Hasselgren et al. | 414/796.9 X |
| 4,081,192 | 3/1978 | Jones | 294/61 |
| 4,194,269 | 3/1980 | Reiche et al. | 414/796.5 X |
| 4,372,548 | 2/1983 | Aurich et al. | 271/18.3 |
| 4,679,784 | 7/1987 | Porat et al. | 294/61 X |
| 5,054,831 | 10/1991 | Ting et al. | 294/61 |

FOREIGN PATENT DOCUMENTS

| | | | |
|---|---|---|---|
| 0453216 | 12/1927 | Germany | 294/61 |
| 2650861 | 5/1978 | Germany | 294/61 |
| 2919097 | 11/1979 | Germany | 294/61 |
| 1031868 | 7/1983 | U.S.S.R. | 294/61 |
| 1470642 | 4/1989 | U.S.S.R. | 294/61 |
| 2009096 | 6/1979 | United Kingdom | 294/61 |

*Primary Examiner*—James W. Keenan
*Attorney, Agent, or Firm*—Flynn, Thiel, Boutell & Tanis

[57] ABSTRACT

The apparatus for removing the waste layer arising in cutting porous concrete blocks comprises a beam (1) which extends above the porous concrete block in its longitudinal direction and can be raised and lowered, and at least two horizontal support frames (2, 2') mounted thereon and movable in height, which are arranged in pairs opposite one another to the two sides of a vertical central plane (M) of the beam (1) and beneath the same. A plurality of spikes (5, 5') which can be stuck into the waste layer are provided on the underside of each support frame (2, 2') and are aligned with their points facing down at an angle. All spikes (5) of the first support frame (2) of each frame pair (P) are parallel to one another and inclined at an acute angle (μ) to the longitudinal central plane (M) and all spikes (5') of the opposite second support frame (2') are parallel to one another and inclined at an opposite acute angle (μl) to the longitudinal central plane (M). Each support frame (2, 2') is movable relative to the beam in the direction (B or C) of its spikes (5, 5').

16 Claims, 5 Drawing Sheets

APPARATUS FOR REMOVING THE UPPER WASTE LAYER RESULTING IN CUTTING PLASTIC POROUS CONCRETE BLOCKS OR THE LIKE

FIELD OF THE INVENTION

The invention generally relates to a cutting machine for cutting concrete blocks and in particular, to an apparatus of the cutting machine for removing a waste layer from the concrete blocks.

BACKGROUND OF THE INVENTION

Porous concrete blocks are cast in molds and demolded after attaining their green strength. The still plastic (green) porous concrete block, which has a length of about 6 to 7.5 m, a width of about 2 m and height of about 65 to 75 cm, is taken to a cutting machine and cut there by means of tensioned steel wires in the longitudinal and transverse directions, so that rectilinear porous concrete bricks, blocks or even slabs result. These are then hardened under steam pressure in an autoclave. On cutting the still plastic porous concrete block, a layer about 3 to 12 cm thick is separated from the upper side and has to be removed before hardening. If the porous concrete block is cut lying horizontal, this waste layer is a layer of irregular height arising in blowing up the porous concrete mass. Porous concrete blocks are however according to DE-PS 958 639 also tipped over through 90° after removal from the mold, so that they then stand on their long narrow side, and are cut precisely in this position. After the cutting the porous concrete block is then turned over through 90° again on to its major wide side (cf. DE-PS 2 108 300), before placement in the autoclave. In cutting a block standing edgewise also, a waste layer of up to 12 cm thickness is taken off at the top, because the narrow side of the plastic porous concrete block can be contaminated by mold oil, the sidewall of the mold is not exactly flat or even runs mostly at a small angle to the wide side of the porous concrete block and because moreover, depending on the format of the bricks or slabs to be cut, there is a residue which is taken into account in the upper layer.

A known apparatus for removing the waste layer resulting in cutting the upper side of plastic porous concrete blocks or the like (DE-PS 1 683 837) comprises a suction box which can be lowered from above over the block and has a plurality of apertures in its underside. A cover arrangement in the form of a flexible film is provided beneath these apertures and can be drawn over a part of the apertures like a blind, in order to cover them. In this manner the apparatus can be used to lift off waste layers of different sizes. The known apparatus is however expensive to manufacture and operate. Since it operates with a vacuum and dust and porous concrete particles get into the suction air when sucking up the waste layer, filters for dust removal from this air are needed and regularly have to be cleaned. If the vacuum suddenly disappears because of loss of current or other disturbance to operation, the waste layer lifted off by the apparatus can moreover come away from the suction box and fall down on to the already cut porous concrete block located thereunder. This is already enough to damage the uppermost porous concrete bricks or slabs, which are then also waste, even with removal of the broken up waste layer by hand.

The object of the invention is to provide an apparatus for removing the waste layer arising in cutting porous concrete blocks, especially porous concrete blocks or the like standing on edge, which can be made inexpensively, involves small operating costs and also has a long working life.

SUMMARY OF THE INVENTION

Such an apparatus is characterized according to the invention by a beam which extends above the porous concrete block in its longitudinal direction and can be raised and lowered, at least two horizontal support frames mounted thereon and movable in height by motor, which are arranged in pairs opposite one another to the two sides of a vertical central plane of the beam and beneath the same, and a plurality of spikes which can be stuck into the waste layer and are provided on the underside of each support frame and are aligned with their points facing down at an angle, wherein all spikes of the first support frame of each frame pair are parallel to one another and inclined at an acute angle to the longitudinal central plane and all spikes of the opposite second support frame are parallel to one another and inclined at an opposite acute angle to the longitudinal central plane, and wherein each support frame is movable relative to the beam in the direction of its spikes.

The invention is thus based on the concept of engaging the waste layer by means of a plurality of spikes, which are stuck down obliquely into the waste layer from two opposite sides and then are lifted up synchronously by means of the support frames, purely mechanically, i.e. without suction air, to engage and lift the layer up from the rest of the porous concrete block. Since there is no suction air contaminated with dust and porous concrete particles, any air filters and servicing the same can be obviated. The apparatus itself consists of relatively simple mechanical components and only needs a relatively small amount of drive power, so that it can be made inexpensively and also only involves small operating costs in use. In the apparatus according to the invention the spikes are held in "gripping position" in the waste layer as soon as they are stuck into this, by the weight thereof and the weight of the movable parts of the apparatus, so that the waste layer engaged by the spikes cannot drop off in the event of a sudden power failure, e.g. loss of current.

Advantageous arrangements of the invention are characterized in the dependent claims.

BRIEF DESCRIPTION OF THE DRAWINGS

The invention is explained in detail below with reference to an embodiment shown in the drawings, in which.

DETAILED DESCRIPTION

Figure 3:
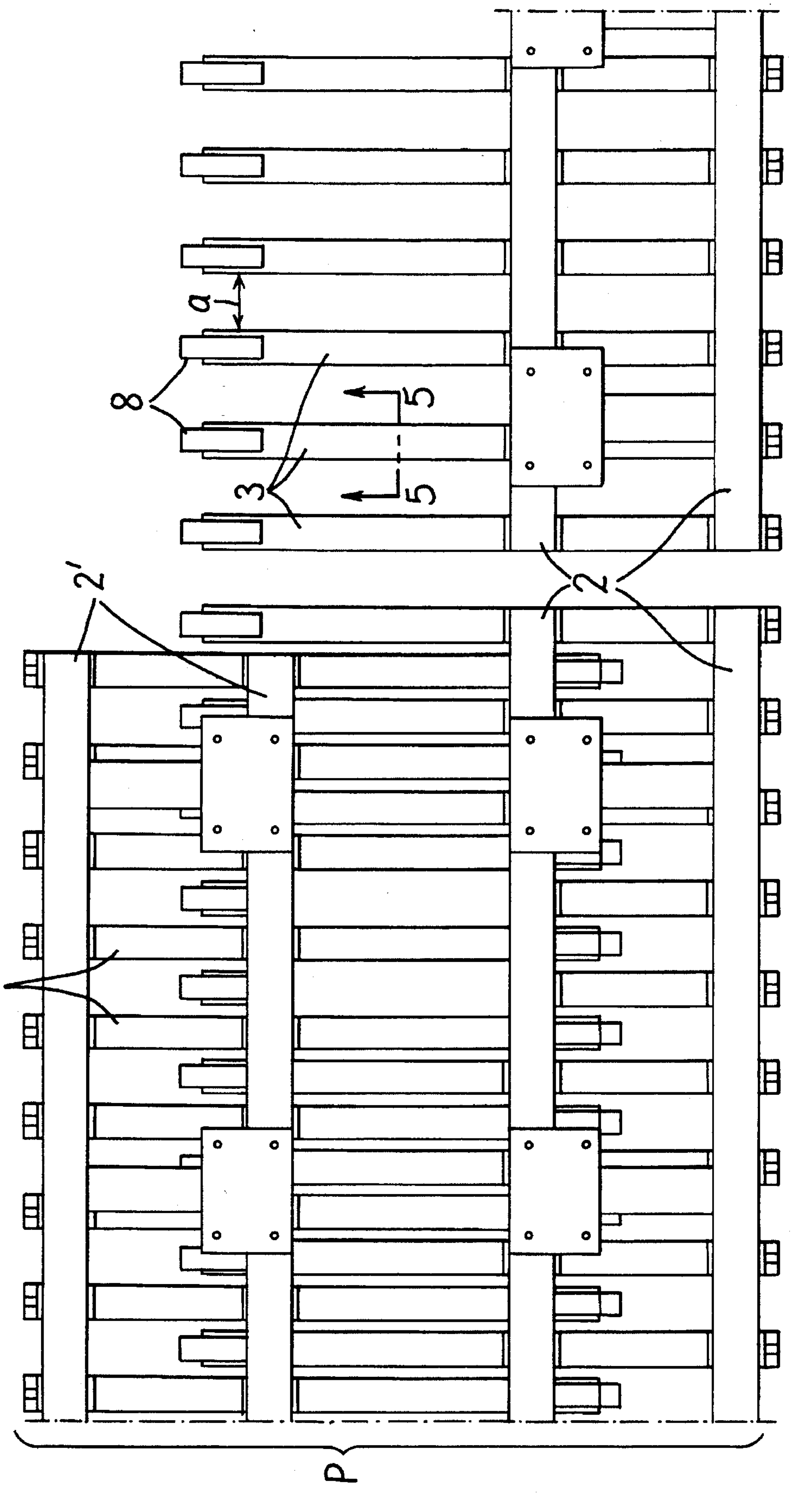
FIG. 3 is a plan view of the support frames with the support rails in the direction III of FIG. 1.
Figure 4:
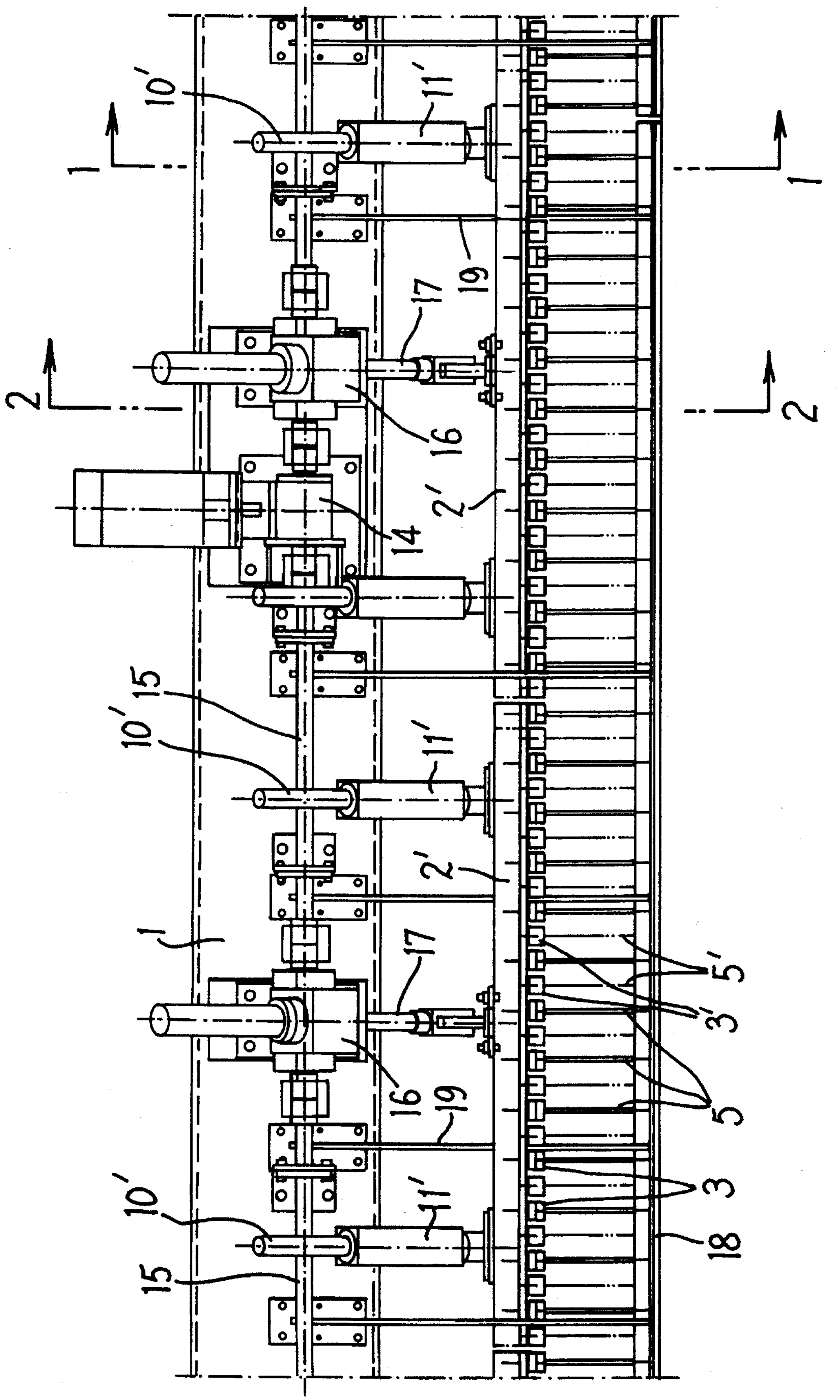
FIG. 4 is a part side view of the apparatus.

The apparatus according to the invention is a component of a cutting machine for cutting a plastic porous concrete block standing on its long, narrow side. The apparatus is arranged in this cutting machine above the long, upper, narrow side of the porous concrete block and comprises a beam 1 which can be raised and lowered in a frame, not shown, and extends parallel to the long, narrow side of the porous concrete block. Below the beam 1 there are a plurality of pairs P of support frames 2, 2'. The support frames 2, 2' are arranged in pairs opposite on another to the two sides of a vertical central plane M. A plurality of support rails 3, 3' are welded to the undersides of these horizontal support frames 2, 2' and extend perpendicular to the vertical longitudinal central plane M. The support rails are spaced from one another by a distance a in the manner of the tines of a rake and project beyond the mutually facing long sides 2*a*, 2'*a* of each frame pair P. As can be seen from FIG. 3, the support rails 3 of the first support frame 2 engage in the gaps between the support rails 3' of the second support frame 2', and vice versa.

Figure 5:
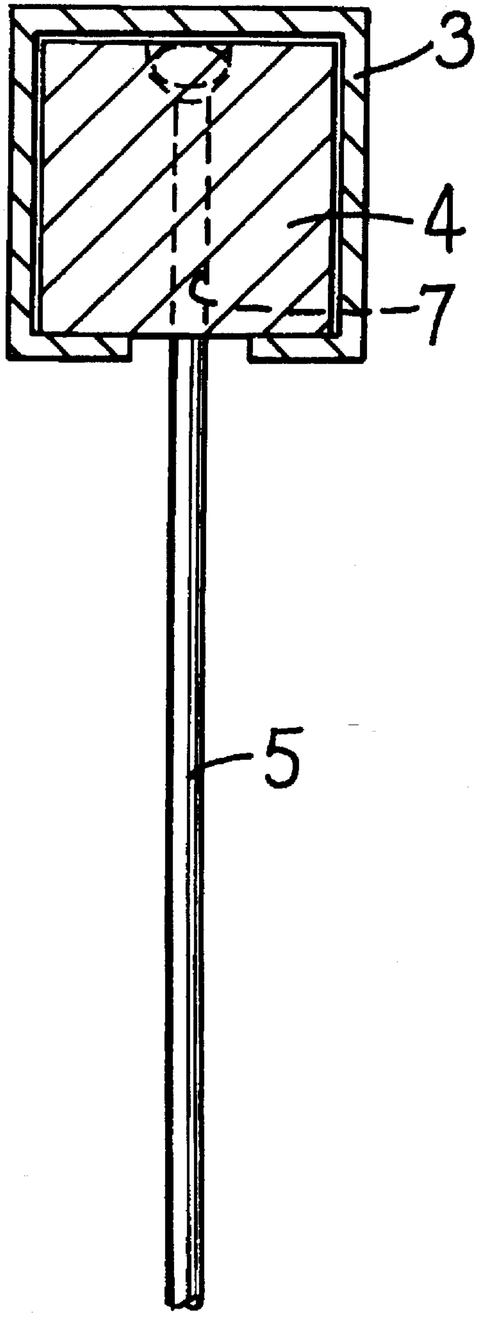
FIG. 5 is a cross-section through a support rail and a spike strip on the line V—V in FIG. 3.

The support rails 3, 3' are each formed as a C-section open downwardly, as is seen especially in FIG. 5. A spike strip 4 can be slipped into this C-section from the end of each support rail 3, 3' and consists for example of an aluminum alloy.

A plurality, e.g. six, of long spikes 5 are arranged obliquely on each spike strip 4, equally spaced from one another and parallel to one another, so that they project downwardly at an angle from the spike strip 4. The spikes 5 of the first support frame 2 are inclined at an acute angle μ of approximately 25° to 35°, preferably 30° to the longitudinal central plane M. All spikes which are associated with the first support frame 2 run parallel to one another and are inclined at the same angle μ to the longitudinal central plane. The first support frame 2 is movable in the direction B, which runs parallel to the longitudinal direction of the spikes 5, relative to the beam 1. The spikes 5' of the second support frame 2' are arranged in like manner in the spike strips, which are slipped into the support rails 3', while all spikes which are associated with the second support frame 2' are arranged parallel to one another but are inclined relative to the longitudinal central plane M at an acute angle μ' which is opposite to the acute angle μ. The angle μ' can be of the same magnitude as the angle μ. An angle of 25° to 35°, preferably 30°, has surprisingly proved to be especially advantageous, since large holding forces are hereby attained in the relatively soft, plastic porous concrete and there is the least danger of breaking out of this porous concrete. The second support frame 2' is movable in the longitudinal direction of its spikes 5' in the direction C relative to the beam 1.

The spikes 5, 5', which advantageously have a length of about 200 mm and a diameter of 2.5 to 5 mm, preferably approximately 3 mm, are pushed from above into respective oblique bores 7 in the spike strips 4, so that their tips are directed downwardly and their heads are located in a countersink on the upper side of the spike strip. When the spike strip 4 is pushed into the support rail 3 or 3', the heads of the spikes can abut the inside of the support rail 3 and they are thus securely held. If there is a breakage or bending of a spike, the associated spike strip 4 can easily be pulled out of the support rail 3 and the damages spike be replaced by a new one. In order that the spike strips 4 shall be held in the associated support rails 3, each support rail 3 has a spring clip 8 at one of its ends, which partially covers the end opening of the support rail 3, while a fixed lip 9 at the other end serves as a stop for the spike strip.

In order to mount the support frames 2, 2' movably, for shifting the height, each of the frames has two guide rods 10, 10', which are inclined as the same acute angle μ, μ' relative to the longitudinal central plane M as the associated spikes 5, 5'. A correspondingly inclined guide bush 11, 11' is provided for each guide rod 10, 10' on the beam 1, the associated guide rods 10, 10' sliding in these bushes.

Figure 1:
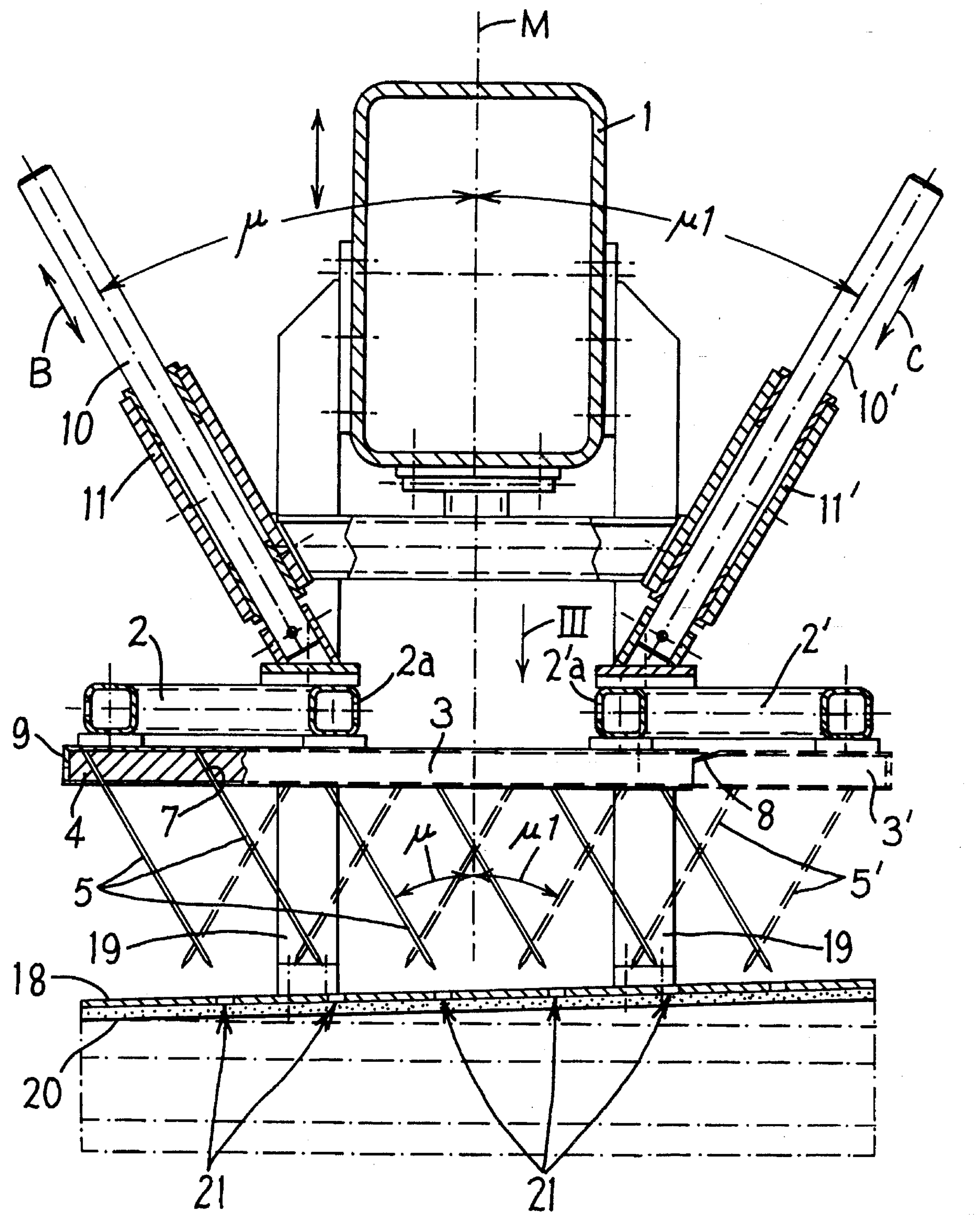
FIG. 1 is a vertical cross-section of the apparatus in the disengaged position, along the line I—I in FIG. 4.

There are six support frames 2 or 2' of like structure arranged on each side of the longitudinal central plane M of the beam 1. In order that these can be synchronously moved up and down, a common adjusting motor 13 is provided for each beam side in the illustrated embodiment, being in the form of a stepping motor. The adjusting motor 13 drives an adjusting gear 16 for each support frame 2 or 2' through bevel gearing 14 and a plurality of shaft sections 15. The adjusting gear 16 comprises a spindle nut driven through bevel gearing and which surrounds a threaded spindle 17 running parallel to the guide rods 10 or 10'. On rotation of the spindle nut the threaded spindle is displaced relative to the adjusting gear 16 and thus moves the associated support frame 2 or 2' in the direction B or C (FIG. 1). In this manner all support frames 2 or 2' on one side of the beam 1 can be moved synchronously up and down. The two adjusting motors on the two sides of the beam 1 can be coupled by a so-called electric shaft, so that all support frames 2 and 2' on the two sides of the beam can be moved up and down synchronously. It would also be possible to provide each support frame with its own adjusting motor and to synchronise the adjusting motors among themselves by electric shafts. Hydraulic or pneumatic adjusting motors could also be used.

Figure 2:
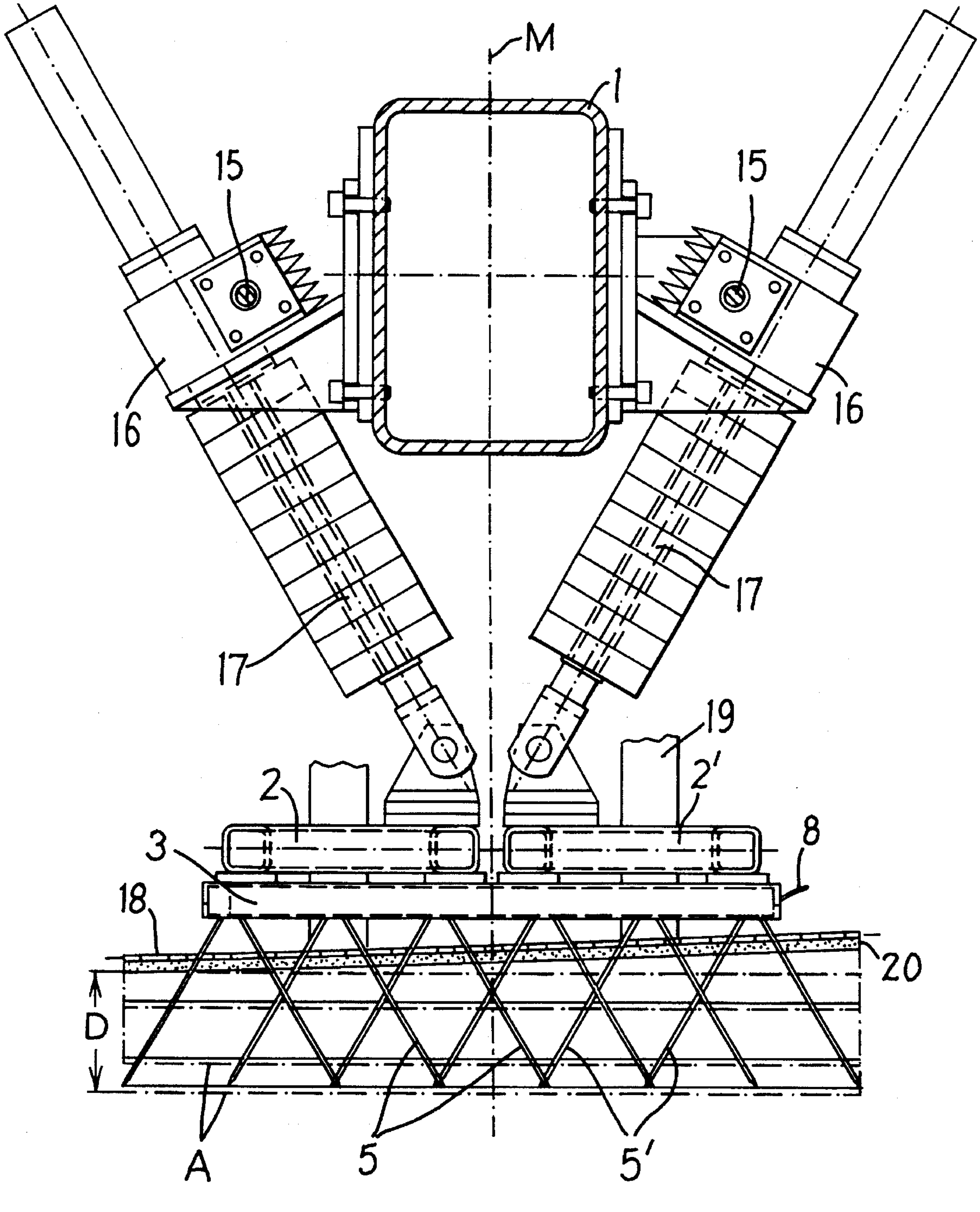
FIG. 2 is a partial vertical section in the gripping or holding position along the line II—II in FIG. 4.

As already explained above, the waste layers to be lifted off can have different thicknesses. A waste layer A with the largest anticipated thickness D is shown in FIG. 2. The thickness if the waste layer increases over the width of the waste layer in the example shown as a result of an obliquely inclined sidewall of the casting mold. There are however also molds with sidewalls which run accurately parallel to one another perpendicular to the bottom, so that the waste layer then has a uniform thickness over its width. In order that the waste layer will be securely carried by the spikes 5, 5', it is necessary for the spikes to penetrate for approximately the whole thickness D into the waste layer. They should not however stick right through the waste layer, since the upper sides of the porous concrete bodies lying below the waste layer would otherwise be damaged. For this reason it is advantageous for the depth of penetration to be so adjusted that a safety margin of for example 5 mm remains between the lower bounding surface of the waste layer and tips of the spikes 5, 5'. In order that waste layers whose thickness if less than the thickness D shown in FIG. 2, the stroke of the support frames 2, 2' in the direction of the associated spikes 5, 5' is adjustable. The adjustment of this stroke is effected with the aid of the adjusting motor 13 in the form of a stepping motor.

In the illustrated embodiment there is further a sheet metal plate 18 arranged some distance below the support frames 2, 2' and fixed to the beam 1 by vertical supports 19. The sheet metal plate 18 is arranged substantially horizontally, where a slight inclination relative to the horizontal is to be comprehended by this, where the angle of inclination relative to the horizontal corresponds to the angle of inclination of the mold sidewalls relative to the vertical. A foam rubber sheet 20 is provided on the underside of the sheet metal plate 18. The sheet metal plate 18 with the foam rubber sheet 20 serves in the first place to support the porous concrete block during transverse cutting. The transverse cutting is effected in that a plurality of wires under tension in a frame are moved through the porous concrete block by moving the frame from below upwards. In order that the plastic material of the porous concrete block shall not break out at its upper narrow side when the wires get into the vicinity of the upper narrow side, the upper narrow side is supported by the sheet metal plate 18 and the foam rubber sheet 20. The cutting wires bear on the foam rubber sheet 20 when the transverse cutting operation is complete.

In order that the spikes 5, 5' can pass through the sheet metal plate 18, this is provided with a sufficiently large aperture 21, e.g. a bore, in the region of each spike 5, 5'. The foam rubber sheet 20 does not need to have any apertures, since it is simply pierced by the sharp spikes 5, 5'. When the spikes 5, 5' are withdrawn upwardly out of the foam rubber sheet 20 on raising the support frames 2, 2', the foam rubber sheet 20 together with the sheet metal plate 18 serves as a stripper, which strips off porous concrete residues possibly adhering to the spikes 5, 5'. Since the stripped residues are on the underside of the foam rubber sheet 20, the simply fall away.

The manner of operation of the novel apparatus is as follows:

The porous concrete block lying on its long, narrow side, is firstly cut in the longitudinal direction by horizontal cutting wires, whereby an upper waste layer is separated off by a cutting wire in the uppermost position. The beam 1 is located with the support frames 2, 2' and the sheet metal plate 18 arranged thereon in its upper position, so that the movement of the longitudinal cutting frame is not hindered. After completion of the longitudinal cutting the beam 1 is lowered vertically, the support frames 2, 2' being in the release position shown in FIG. 1. The lowering of the beam 1 is effected so far that the foam rubber sheet 20 bears on the upper narrow side of the porous concrete block. The transverse cutting is then effected from the bottom up, until the cutting wires bear on the foam rubber sheet 20. By actuating the adjusting motors 13 the support frames 2, 2' are now displaced obliquely downwards, so that the spikes 5, 5' are stuck into the waste layer obliquely from two opposite sides, until their tips are located a safety distance of 5 mm above the lower bounding surface of the waste layer. This engagement or holding position of the support frames 2, 2' and their spikes 5, 5' is shown in FIG. 2. In this position of the support frames 2, 2' the beam 1 is raised again, so that the spikes 5, 5' stuck into the waste layer raise this. Since the spikes of each spike strip 4 are arranged at a mutual horizontal spacing of about 90 mm and the horizontal spacing of one row of spikes 5 relative to the next row of spikes 5' only amounts to about 40 mm, the waste layer is held by a plurality of spikes at relatively small spacings. After the waste layer has been raised in the manner described, the porous concrete block cut in the longitudinal and transverse directions is tilted back through 90° on to its wide side and then put in an autoclave. As soon as the porous concrete block has been removed from the region below the beam, the support frames 2, 2' are moved obliquely upwards by means of the adjusting motors 13, out of their lower, gripping or holding position, so that the spikes 5, 5' are withdrawn from the waste layer. This thus loses their support and falls down on to a conveyor belt provided at the bottom of the cutting machine, through which the waste layer, which has broken up in falling, is carried off. The still plastic porous concrete mass of the waste layer is mixed as so-called fresh waste of the porous concrete mass of a further charge.

We claim:

1. An apparatus for removing a waste layer arising in cutting porous concrete blocks comprising:

a beam which extends in a longitudinal direction above the porous concrete block and can be raised and lowered;

at least first and second horizontal support frames supported by said beam on an underside thereof which are movable in height by a motor, said first and said second support frames being arranged in at least one frame pair opposite one another on the two opposite sides of a vertical central plane of said beam which extends longitudinally along said beam;

support rails extending perpendicular to said vertical central plane and mutually spaced a predetermined distance apart from one another in said longitudinal direction to define gaps therebetween, at least a first plurality of said support rails being arranged on an underside of said first support frame and at least a second plurality of said support rails being arranged on an underside of said second support frame, said first plurality of said support rails being received in said gaps between said second plurality of said support rails, and vice versa; and a plurality of spikes which can be inserted into the waste layer and protect from said support rails on said underside of each said support frame, said spikes each terminating at a point and being aligned with said points facing down at an angle, wherein all of said spikes of said first support frame of each said frame pair are parallel to one another and inclined at a first acute angle relative to said vertical central plane and all of said spikes of said second support frame opposite said first support frame are parallel to one another and inclined at a second acute angle relative to said vertical central plane which is opposite said first acute angle, each said support frame being movable relative to said beam in the direction of said spikes projecting 2. The apparatus according to claim 1, wherein said support rails project beyond mutually facing longitudinal sides of said support frames of each said frame pair.

3. The apparatus according to claim 1, wherein each said support rail includes a spike strip releasably attached thereto, each said spike strip including a plurality of said spikes which are inclined obliquely relative to said spike strip and are uniformly spaced from one another in a row on said spike strip.

4. The apparatus according to claim 3, wherein each said support rail has a C-shaped cross sectional shape which defines an opening on an underside thereof and defines an interior channel having an open end, said spike strip being inserted from said open end into said interior channel.

5. The apparatus according to claim 4, wherein said spikes are fitted from above in oblique bores in said spike strips and have heads which abut on an inside surface of said support rails.

6. The apparatus according to claim 1, wherein said spikes are inclined at said first and said second angles relative to said vertical central plane of 25° to 35°.

7. The apparatus according to claim 1, wherein said spikes are each about 200 mm long.

8. The apparatus according to claim 7, wherein said spikes each have a diameter of 2.5 to 5 mm.

9. The apparatus according to claim 1, which includes means defining a stroke of each support frame through which each said support frame is movable in the direction of said spikes projecting therefrom, said stroke being adjustable.

10. The apparatus according to claim 1, wherein each said support frame has a guide rod which is inclined at the same acute angle relative to said vertical central plane as said spikes projecting from said support frame, a correspondingly inclined guide bush being provided for each said guide rod on said beam which said guide bush slidingly receives said corresponding guide rod.

11. The apparatus according to claim 1, wherein a stripper is provided below said support frames, said stripper having apertures for passage of said spikes therethrough, wherein said spikes can be withdrawn fully upwards out of said apertures to strip off waste layer being removed thereby.

12. The apparatus according to claim 11, wherein said stripper comprises a substantially horizontal sheet metal plate.

13. The apparatus according to claim 12, wherein a foam rubber sheet is provided on an underside of said sheet metal plate.

14. The apparatus according to claim 11, wherein said stripper is connected to said beam by vertical supports.

15. The apparatus according to claim 1, wherein a plurality of said frame pairs are arranged alongside each other in said longitudinal direction along said beam.

16. The apparatus according to claim 15, wherein at least said support frames on the one side of said vertical central plane are movable in synchronism.

* * * * *

UNITED STATES PATENT AND TRADEMARK OFFICE
CERTIFICATE OF CORRECTION

PATENT NO. : 5 513 945

DATED : May 7, 1996

INVENTOR(S) : Wilfried HARTMANN et al.

It is certified that error appears in the above-indentified patent and that said Letters Patent is hereby corrected as shown below:

Column 6, line 13; change "protect" to ---project---.
line 25; after "projecting" insert ---therefrom---.
line 67; after "off" insert ---a---.

Signed and Sealed this

Twenty-seventh Day of August, 1996

Attest:

Bruce Lehman

BRUCE LEHMAN

Attesting Officer

Commissioner of Patents and Trademarks